PELLETING PROCESS AND APPARATUS
Filed Oct. 3, 1955
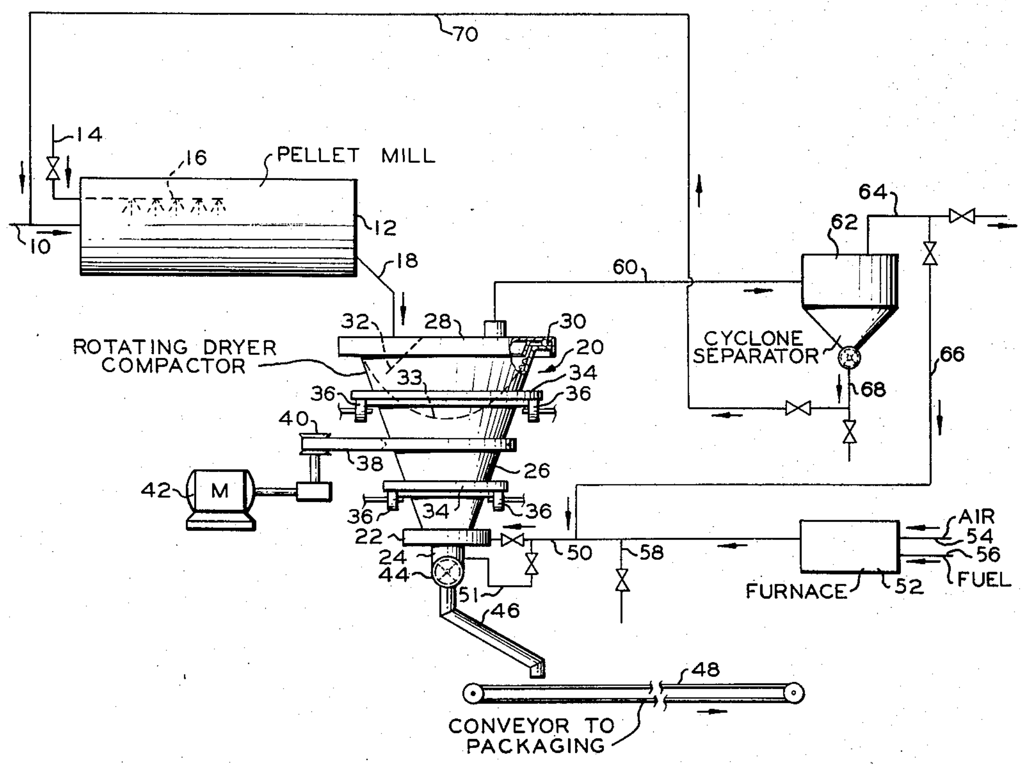
*INVENTOR.*
L.W. POLLOCK
*BY* Hudson & Young
*ATTORNEYS*

United States Patent Office 2,880,519

Patented Apr. 7, 1959

2,880,519

PELLETING PROCESS AND APPARATUS

Lyle W. Pollock, Bartlesville, Okla., assignor to Phillips Petroleum Company, a corporation of Delaware Application October 3, 1955, Serial No. 537,943

9 Claims. (Cl. 34—8)

The invention relates to a process and apparatus for pelleting loose powdered materials such as carbon black, metal oxides for catalysts, adsorbents, other utilities, etc.

Numerous materials which are produced in powdered form are conventionally pelleted by various techniques in order to render them more suitable for shipping and for use in manufacturing processes. Powdered metal oxides which are catalytic in nature in many chemical processes are frequently pelleted in order to provide agglomerates suitable for use in fixed bed catalytic processes. In the carbon black producing industry, dry flocculent carbon black in the form of a loose powder is generally pelleted before shipment to the point of use in the rubber industry, as well as in other industries. It is common practice to pellet loose carbon black in a horizontally rotating pellet mill or in a pug mill, whereby spherical pellets are formed. In these processes water is added to the carbon black in many instances in order to facilitate the pelleting process and provide pellets of improved characteristics. The amount of water used in pelleting varies from 2 or 3 percent up to 45 to 50 percent by weight of the carbon black. After pelleting with the aid of water, the water content of the pellets must be reduced by some method to not more than about 1 percent by weight. It is also conventional to screen the pellets or otherwise classify them so as to obtain a pelleted product of more uniform size and low in fines content. One of the purposes of pelleting, in addition to rendering the carbon black more suitable for shipment, is to provide a pelleted product of greater density or mass per unit volume than that of the loose black before pelleting, thereby greatly decreasing the bulk of the product. This invention provides a process and apparatus which simultaneously dries, compacts, and classifies moisture-containing pellets from a wet pelleting process so as to greatly improve the strength, decrease the dust or fines content, increase the density and uniformity of the pellets and reduce the moisture content to less than 1 percent by weight.

It is an object of the invention to provide a process and apparatus for pelleting a loose powdered material with the aid of a liquid, such as water. Another object is to provide a process and apparatus for drying and compacting moisture-containing pellets of powdered material. Another object is to provide an improved process for pelleting carbon black using water which simultaneously compacts, dries, and classifies the pellets. A further object is to provide a process and apparatus for pelleting carbon black which produces harder, stronger, and more dense pellets than are produced by conventional processes. Other objects of the invention will become apparent from a consideration of the accompanying disclosure.

In accordance with the invention, moisture-containing pellets are produced by adding water to a dry powdered material, such as carbon black or powdered metal oxides, in a pelleting drum or pug mill to form substantially spherical pellets and the wet pellets from the drum or mill are then transferred to a rotating conical dryer, compactor, and classifier where they are subjected to centrifugal action in contact with a circulating dry gas, such as hot air or hot combustion gas, so as to reduce the moisture content to an acceptable level, preferably, below about 1 percent.

In order to provide a more complete understanding of the invention, reference is made to the drawing which shows a perferred schematic arrangement of apparatus in accordance with the invention. The apparatus and process will be described in connection with the pelleting of loose carbon black but it is to be understood that the apparatus and process are also applicable to the pelleting of any loose powdered material which is not deleteriously effected by contacting the same with water.

Loose carbon black is passed by transfer line or conveyor 10 onto a pellet mill 12 which may be a horizontally rotating drum type mill or a conventional pug mill. Water is introduced to the pellet mill through line 14 which connects with suitable spray means 16 inside the mill. The production of wet or spherical pellets in mill 12 is conventional and this step alone does not comprise the invention. The moist pellets are transferred by suitable conveyor means 18 to a conical dryer, compactor, and classifier 20 hereinafter referred to as a dryer. Dryer 20 is in the form of an inverted truncated cone terminating at the bottom in a sealing device 22 which is attached to an upright conduit 24 and provides sealing engagement with the dryer shell 26. A stationary lid or cover 28 forms a rotating seal 30 with the top flange or edge of shell 26. A baffle 32 attached to the underside of cover 28 is positioned so as to direct the incoming stream of pellets from conveyor 18 to an area adjacent shell 26 where the pellets are introduced to the rotating pellet bed 33 in the dryer without undue attrition and breakage thereof.

Dryer 20 includes one or more circular tracks 34 which engage supporting rollers or wheels 36 with which they cooperate to hold the dryer in vertical and horizontal alignment. Rotation of dryer 20 is effected by means of a V-belt or drive chain 38 which engages a V-pulley or girth gear fixed to shell 26 and also engages a suitable driving means 40 such as a gear wheel or V-pulley on a shaft of an electric motor 42 or other suitable motive power device.

A gas lock valve 44 positioned in the lower section of conduit 24 provides for gravitation of dry pellets into a delivery chute or conduit 46 without substantial passage of gas therethrough. Dry pellets are delivered by chute 46 onto a suitable conveyor means 48 for transfer to packaging, shipment, or use as desired.

Hot air, hot combustion gas, or other suitable drying gas is introduced to the lower section of the dryer either through sealing means 22 via line 50 or directly to conduit 24 via lines 50 and 51. One method of providing hot combustion gas is by means of furnace 52 which connects with line 50 and is provided with air line 54 and fuel line 56 which supply a combustible mixture to the furnace. Where desired, the furnace 52 may be used as an indirect heat exchanger for heating a stream of air which can be passed via line 50 to the dryer. An auxiliary line 58 connects with line 50 for supplying any conventional treating agent for the carbon black, such as $SO_2$.

Effluent gas from dryer 20 is passed via line 60 to any suitable gas-solid separator, such as cyclone separator 62, from which the denuded gas is passed via line 64 to any suitable disposal. It is advantageous to recycle at least a portion of the denuded gas via line 66 to line 50 for reuse in the drying process. By recycling only a portion of the off-gas from separator 62 and venting the remaining portion from line 64, the moisture content of the dry gas passing through line 50 to the dryer can be controlled in conventional manner within desirable limits suitable for the drying step.

Fines from the process which are recovered in separator 62 are gravitated into line 68 from which they may be recovered directly for any desirable use or from which they may be advantageously transferred via line 70 to the feed end of the pellet mill 12, directly, or via line 10.

Describing the process effected in dryer 20, the moisture-laden pellets introduced through line 18 are eased into the pellet bed 33 by baffle 32 as the shell 26 is rotated. During the rotation of the dryer hot drying gas, such as combustion gas introduced through line 50, passes upwardly through the rotating bed in direct contact with the pellets therein so as to deplete the water content of the pellets and reduce the same to any suitable concentration, particularly, a concentration below 1 percent which is generally accepted in the carbon black art as of specification grade. The ascending gas entrains carbon black dust from the lowermost section of the bed and carries it into the upper section of the bed in dryer 20 where most of the dust is impacted onto the surface of the moist, incoming pellets. A small amount of dust is carried out of dryer 20 through line 60 to separator 62 as described above. During the rotation of the dryer the larger pellets simultaneously travel to the inner wall of shell 26 and gravitate toward the bottom of the conveyor, thereby leaving the smaller pellets and fines near the axis of the dryer because of the centrifugal force resulting from the dryer rotation. Particles of intermediate size and unsatisfactory pellets remain in the dryer until they are combined with larger pellets and/or reduced to dust. During the drying step, there is a substantial amount of pelleting going on, particularly, in view of the contacting of the stream of wet pellets in the upper portion of the dryer with fines and intermediate size particles which work their way to the upper portion of the bed and near the axis of the dryer. A substantial amount of fines adhere to the moist pellets during the initial phase of the drying and thereby become a part of the larger size pellets which egress from the bottom of the dryer.

It is also found that during the drying step the rotation of the dryer effects a substantial compacting action on the pellets thereby rendering them stronger and more dense than the incoming stream of pellets. Pellets from a wet or semi-wet pelleting process are conventionally in the range of 15 to 20 pounds per cubic foot density. The process of the invention effected in dryer 20 increases the density of the pelleted carbon black to the range of 23 to 28 pounds per cubic foot and also greatly increases the strength of the finished pellets. In addition, the action of dryer 20 during the compacting and drying has a classifying effect on the pellets going through the dryer so that small and intermediate size pellets are broken down and become compacted on the outside surface of larger pellets thereby producing larger and/or more uniform pellets. Another advantage in the process and apparatus lies in the fact that due to the passage of hot drying gas upwardly through the rotating bed from the bottom thereof, substantially all of the fines and dust are removed from the pellet stream as it passes through conduit 24 so that the pelleted product delivered to conveyor 48 is substantially free of fines and dust and is of more uniform size than heretofore obtained in conventional processes.

It is to be understood that the rate of flow of gas through dryer 20 should be regulated so that only dust is removed through line 60 without substantial entrainment of pellets from the surface of bed 33. The rate of rotation of dryer 20 should be maintained in the range of 20 to 300 r.p.m. and, preferably, in the range of about 40 to 100 r.p.m. in order to obtain optimum advantage from the process described. Of course, it is to be understood that the speed of the dryer is a function of the maximum diameter thereof and should be regulated in the disclosed range in accordance therewith. The range of speed is applicable to dryers having a minimum diameter of two feet or larger.

Certain modifications of the invention will become apparent to those skilled in the art and the illustrative details disclosed are not to be construed as imposing unnecessary limitations on the invention.

I claim:

1. A process for treating wet pellets of particulate solid material which comprises subjecting said pellets to complete rotation around an upright axis and centrifugal action in an enclosed downwardly converging drying zone whereby said pellets roll and progressively move to an outlet in the bottom of the said zone; and simultaneously passing a drying and transport gas upwardly through the pellets in said zone so as to dry said pellets and transport fines from a lower level in said zone to an upper level therein and compact said fines on pellets at said upper level, whereby pellets passing thru said outlet are substantially free of fines.

2. The process of claim 1 wherein said material comprises carbon black, said pellets are maintained in an inverted generally truncated conical bed in said zone, and said zone is rotated at a rate in the range of 20 to 300 r.p.m.

3. The process of claim 2 wherein said drying gas comprises hot dry air.

4. A centrifugal dryer comprising in combination an upright inverted truncated conical shell rotatable on its vertical axis; a stationary cover forming a sliding seal with the upper end of said shell; inlet means in said cover for introducing material to said dryer; an outlet in the lower end of said shell for said material; means for introducing gas into a lower section of said shell; means for withdrawing gas thru said cover; and means for supporting and rotating said shell.

5. The dryer of claim 4 including a stationary closure member forming a slidable seal on the lower end of said shell; and a depending conduit from said member having a gas lock valve therein for passing material from said dryer downwardly thru said conduit.

6. The dryer of claim 4 wherein the support means comprises a pair of horizontal circular tracks on the outside of said shell and a plurality of fixed rollers adapted to ride said tracks upon rotation of said shell and the means for rotating said shell comprises a drive band on the outside of said shell.

7. A process for drying and compacting wet pellets of particulate solid material which comprises introducing said pellets into an upper section of an enclosed drying and compacting zone converging to an outlet at its bottom so as to maintain a bed of pellets therein; rotating said pellets about a vertical axis so as to subject said pellets to centrifugal force outwardly from said axis against each other and against the wall of said zone; withdrawing pellets from said outlet so that pellets progress downwardly thru said bed to said outlet while said force is applied, thereby rolling and compacting said pellets; and passing a drying gas upwardly thru said bed of pellets during rotation thereof so as to transport fines from lower to upper pellets in said bed, whereby said fines are compacted onto said pellets at said upper level.

8. A centrifugal compactor-dryer comprising in combination an upright closed inverted truncated conical chamber rotatable about its vertical axis; means for introducing particulate material into an upper section of said chamber; outlet means for said material and inlet means for drying gas in the bottom of said chamber; and an outlet for gas in an upper section of said chamber.

9. The process of claim 1 wherein said pellets consist essentially of carbon black having a density in the range of 15 to 20 pounds per cubic foot (on a dry basis) and same are dried to a moisture content below one weight percent and are compacted to a density in the range of 23 to 28 pounds per cubic foot.

References Cited in the file of this patent

UNITED STATES PATENTS

| | | |
|---|---|---|
| 1,157,087 | Gross | Oct. 19, 1915 |
| 1,717,178 | Altorfer | June 11, 1929 |
| 2,283,364 | Hanson et al. | May 19, 1942 |
| 2,304,382 | Schoeld | Dec. 8, 1942 |
| 2,457,962 | Whaley | Jan. 4, 1949 |
| 2,684,290 | Alexander et al. | July 20, 1954 |
| 2,744,338 | Rothe | May 8, 1956 |

UNITED STATES PATENT OFFICE
CERTIFICATE OF CORRECTION

Patent No. 2,880,519 April 7, 1959

Lyle W. Pollock

It is hereby certified that error appears in the printed specification of the above numbered patent requiring correction and that the said Letters Patent should read as corrected below.

Column 2, line 18, for "onto" read -- into --; line 22, after "or" insert -- moist --.

Signed and sealed this 9th day of February 1960.

(SEAL)
Attest:

KARL H. AXLINE
Attesting Officer

ROBERT C. WATSON
Commissioner of Patents